US006957527B2

(12) United States Patent
Ueda et al.

(10) Patent No.: US 6,957,527 B2
(45) Date of Patent: Oct. 25, 2005

(54) DEVICE AND METHOD FOR ESTIMATING CATALYTIC TEMPERATURE

(75) Inventors: Katsunori Ueda, Okazaki (JP); Kenichi Nakamori, Okazaki (JP); Ken Fujiwara, Okazaki (JP); Hideyuki Handa, Okazaki (JP)

(73) Assignee: Mitsubishi Jidosha Kogyo Kabushiki Kaisha, (JP)

( * ) Notice: Subject to any disclaimer, the term of this patent is extended or adjusted under 35 U.S.C. 154(b) by 15 days.

(21) Appl. No.: 10/787,893

(22) Filed: Feb. 26, 2004

(65) Prior Publication Data

US 2004/0230366 A1    Nov. 18, 2004

(30) Foreign Application Priority Data

Feb. 28, 2003 (JP) ................................ 2003-53677

(51) Int. Cl.[7] .............................................. F01N 3/00
(52) U.S. Cl. ............................ 60/274; 60/277; 60/284; 60/286; 60/300; 73/118.1
(58) Field of Search ........................... 60/274, 277, 284, 60/285, 286, 300; 701/112; 73/118.1

(56) References Cited

U.S. PATENT DOCUMENTS

| 5,307,626 A | * | 5/1994 | Maus et al. | 60/274 |
|---|---|---|---|---|
| 5,606,855 A | | 3/1997 | Tomisawa | 60/274 |
| 5,832,721 A | * | 11/1998 | Cullen | 60/274 |
| 5,884,477 A | | 3/1999 | Andou et al. | 60/285 |
| 5,956,941 A | * | 9/1999 | Cullen et al. | 60/274 |
| 6,151,890 A | * | 11/2000 | Hoshi | 60/297 |
| 6,481,201 B2 | * | 11/2002 | Kako et al. | 60/285 |
| 6,883,310 B2 | * | 4/2005 | Nakatani et al. | 60/288 |

FOREIGN PATENT DOCUMENTS

| JP | 2860866 B2 | 12/1998 |
|---|---|---|
| JP | 3262157 B2 | 12/2001 |

* cited by examiner

*Primary Examiner*—Binh Q. Tran
(74) *Attorney, Agent, or Firm*—Rossi, Kimms & McDowell, LLP

(57) ABSTRACT

A device for periodically estimating the temperature of an exhaust-gas purifying catalyst provided in the exhaust pipe of an internal combustion engine. The device includes first, second, third, and fourth estimation blocks. The first estimation block estimates the temperature of exhaust gases that are discharged from the combustion chamber, as a steady catalytic temperature under a steady operation of the internal combustion engine, based on operating conditions of the internal combustion engine. The second estimation block estimates a representative temperature of the interior wall of the exhaust pipe extending from the internal combustion engine to the catalyst, based on the estimated steady catalytic temperature. The third estimation block estimates a catalyst inflow exhaust-gas temperature that flows in the catalyst, based on the estimated steady catalytic temperature and the estimated representative temperature. The fourth estimation block estimates the temperature of the catalyst based on the estimated catalyst inflow exhaust-gas temperature.

20 Claims, 6 Drawing Sheets

DEVICE AND METHOD FOR ESTIMATING CATALYTIC TEMPERATURE

BACKGROUND OF THE INVENTION

1) Field of the Invention

The present invention relates to a device and method for estimating the temperature of an exhaust-gas purifying catalyst.

2) Description of the Related Art

In an internal combustion engine (hereinafter referred to an engine), the exhaust system is provided with an exhaust-gas purifying catalyst (hereinafter referred to simply as a catalyst) that purifies exhaust gases by causing the harmful substances in the exhaust gases to react each other to make them harmless. If this catalyst exceeds a prescribed temperature (i.e., a heat-resisting temperature), sintering (particles held by a catalytic carrier coalesce into a porous mass at high temperature) will take place. Consequently, not only does the ability to purify exhaust gases decline, but the catalyst itself also degrades thermally.

Therefore, during travel of a vehicle such as an automobile (i.e., during engine operation), it is necessary to sense or estimate the temperature of the catalyst and prevent thermal degradation of the catalyst. The temperature near the catalyst can be measured, for example, by arranging the heat-sensing portion of a wide-range temperature sensor (or a high-temperature sensor) within a catalyst container. However, since such a sensor is expensive, there have been developed techniques to estimate a catalytic temperature without providing that expensive sensor. For example, there is a technique to estimate the amount of heat radiated from the exterior surface of a catalyst from the engine cooling water temperature and vehicle speed at the time of an engine start, estimate from the amount of intake air the amount that the catalyst absorbs heat from exhaust gases, and estimate a catalytic temperature based on the amount of heat radiation and the amount of heat absorption (Japanese Patent Publication No. 2860866).

As set forth above, if the catalyst exceeds its heat-resisting temperature it will degrade thermally. The heat-resisting temperature of the catalyst is lower in an atmosphere of oxidization (lean air-fuel ratio) than in an atmosphere of deoxidization (rich air-fuel ratio). If the upper-limit temperature of the catalyst is set with a sufficient margin for the low heat-resisting temperature in an atmosphere of oxidization, and the engine is controlled so that an estimated catalytic temperature does not exceed that upper-limit temperature, then the catalyst can be reliably protected, but the engine operation is restricted greatly. Hence, in order to prevent thermal degradation of the catalyst while minimizing the restrictions on engine operating conditions, it is necessary to accurately grasp the catalytic temperature and control the engine operation so that the catalyst does not exceed its heat-resisting temperature relating to an air-fuel ratio.

Particularly, in vehicles with the function of cutting fuel during deceleration, the supply of fuel to the engine is temporarily cut in order to achieve $CO_2$ reduction (i.e., fuel consumption reduction). Because of this, only air will be discharged from the cylinder where fuel is being cut, and the chances of the catalyst reaching high temperature in an atmosphere of oxidization will increase. Also, there are vehicles in which, when engine load is low, the air-fuel ratio is made leaner than a stoichiometric air-fuel ratio to achieve the reduction of fuel consumption. However, even in such vehicles, the chances of the catalyst reaching high temperature in an atmosphere of oxidization will increase. For that reason, a more accurate grasp of the catalytic temperature, and engine control (including air-fuel ratio control) based on that accurate temperature, are required.

However, the catalytic temperature changes with various factors, so it cannot be simply detected or estimated from the amount and temperature of exhaust gases. For instance, while exhaust gases are going from the engine to the catalyst, they are cooled by a travel wind, heat transfer to the exhaust system, etc. Also, because the catalyst itself is heated, it takes time before the temperature of the catalyst rises. For that reason, in the conventional technique for estimating a catalytic temperature solely from the amount and temperature of exhaust gases, as in the above-described Japanese Patent Publication No. 2860866, it is fairly difficult to accurately estimate a catalytic temperature.

SUMMARY OF THE INVENTION

The present invention has been made in view of the above-described problems. Accordingly, it is the primary object of the present invention to provide a catalytic temperature estimating device and catalytic temperature estimating method that are capable of accurately estimating the temperature of an exhaust-gas purifying catalyst provided in the exhaust system of an engine.

To achieve the aforementioned object of the present invention, there is provided a device for periodically estimating a temperature of an exhaust-gas purifying catalyst provided in an exhaust pipe of an internal combustion engine. The device comprises first estimation means, second estimation means, third estimation means, and fourth estimation means. The first estimation means estimates a temperature of exhaust gases that are discharged from a combustion chamber of the internal combustion engine, as a steady catalytic temperature under a steady operation of the internal combustion engine, based on operating conditions of the internal combustion engine. The second estimation means estimates a representative temperature of an interior wall of the exhaust pipe extending from the internal combustion engine to the catalyst, based on the steady catalytic temperature estimated by the first estimation means. The third estimation means estimates a catalyst inflow exhaust-gas temperature that flows in the catalyst, based on the steady catalytic temperature estimated by the first estimation means and the representative temperature of the interior wall of the exhaust pipe estimated by the second estimation means. The fourth estimation means estimates the temperature of the catalyst based on the catalyst inflow exhaust-gas temperature estimated by the third estimation means.

In this way, a catalytic temperature is estimated in consideration of the amount that the heat of exhaust gases is absorbed by the interior wall of the exhaust pipe, so it can be accurately estimated.

In the device of the present invention, the aforementioned first estimation means employs engine speed and engine load as the operating conditions of the internal combustion engine. For that reason, the steady catalytic temperature is estimated according to the operating conditions of the internal combustion engine, that is, engine speed (Ne) and engine load (Pb). Thus, the temperature of the catalyst is estimated according to operating conditions of the internal combustion engine obtained in each cycle and can be more accurately estimated.

The aforementioned second estimation means estimates the representative temperature of the interior wall of the exhaust pipe on the assumption that the representative temperature changes with a first-order lag corresponding to an exhaust-gas flow velocity within the exhaust pipe with respect to a change in the steady catalytic temperature estimated by the first estimation means. Therefore, the temperature of the catalyst can be more accurately estimated.

The aforementioned third estimation means estimates the catalyst inflow exhaust-gas temperature by computing the weighted average of the steady catalytic temperature estimated by the first estimation means and the representative temperature of the interior wall of the exhaust pipe estimated by the second estimation means, according to an exhaust-gas flow quantity within the exhaust pipe. Therefore, the temperature of the catalyst can be more accurately estimated.

The aforementioned fourth estimation means estimates the temperature of the catalyst on the assumption that the temperature of the catalyst changes with a first-order lag corresponding to an exhaust-gas flow quantity within the exhaust pipe with respect to a change in the catalyst inflow exhaust-gas temperature estimated by the third estimation means. Therefore, the temperature of the catalyst can be more accurately estimated.

The aforementioned steady catalytic temperature that is estimated by the first estimation means is computed by correcting the temperature of the exhaust gases based on a temperature reduction quantity due to heat radiated from the exhaust pipe. Therefore, a catalytic temperature can be more accurately estimated.

The correction of the temperature reduction quantity due to the radiant heat is made according to vehicle speed and an exhaust-gas flow quantity within the exhaust pipe. Therefore, since the temperature reduction quantity is estimated according to vehicle speed in each cycle, the temperature of the catalyst can be more accurately estimated.

The correction of the temperature reduction quantity corresponding to vehicle speed is made according to an atmospheric temperature of the exhaust pipe or intake-air temperature that correlates to the atmospheric temperature. Therefore, since the outside air temperature, etc., are also taken into consideration in each cycle, the temperature of the catalyst can be more accurately estimated.

The steady catalytic temperature that is estimated by the first estimation means is computed by correcting the temperature of the exhaust gases according to a knock retard quantity relating to ignition timing of the internal combustion engine. Therefore, since the steady catalytic temperature is estimated on the assumption that it rises according to a knock retard quantity relating to ignition timing of the internal combustion engine, the temperature of the catalyst can be more accurately estimated.

The temperature of the catalyst that is estimated by the fourth estimation means is computed by employing the catalyst inflow exhaust-gas temperature corrected based on a temperature reduction quantity due to heat radiated from the exhaust pipe. Therefore, the temperature of the catalyst can be more accurately estimated.

The correction of the temperature reduction quantity due to the radiant heat is made according to vehicle speed and an exhaust-gas flow quantity within the exhaust pipe. Therefore, since the temperature reduction quantity is estimated according to vehicle speed in each cycle, the temperature of the catalyst can be more accurately estimated.

The correction of the temperature reduction quantity corresponding to vehicle speed is made according to an atmospheric temperature of the exhaust pipe or intake-air temperature that correlates to the atmospheric temperature. Therefore, since the outside air temperature, etc., are also taken into consideration in each cycle, the temperature of the catalyst can be more accurately estimated.

In the catalytic temperature estimating device of the present invention, the internal combustion engine is equipped with fuel-cut judgment means for judging whether or not fuel-cut control is being performed. When it is judged by the fuel-cut judgment means that fuel-cut control is being performed, the first estimation means adopts the temperature of the catalyst estimated last, as the temperature of the catalyst. When estimating the temperature of said catalyst for the first time after a start of the internal combustion engine and it is judged by said fuel-cut judgment means that fuel-cut control is being performed, the first estimation means adopts an initial catalytic temperature that is on a higher-temperature side within an operating temperature range of the catalyst previously set, as the temperature of the catalyst. In this way, there is no possibility that an estimated catalytic temperature will be too low compared to the actual value. Therefore, there is no possibility that when the catalyst exceeds its heat-resisting temperature, F/C control will be performed. Thus, in thermal degradation of the catalyst, the worst case can be prevented.

The aforementioned second estimation means is constructed to estimate a representative temperature of the interior wall of the exhaust pipe, based on the steady catalytic temperature estimated by the first estimation means and a representative temperature of the interior wall of the exhaust pipe estimated last. And when estimating the temperature of the catalyst for the first time after a start of the internal combustion engine, the second estimation means estimates a representative temperature of the interior wall of the exhaust pipe, based on the steady catalytic temperature estimated by the first estimation means and an initial exhaust pipe wall temperature that is on a higher-temperature side within an operating temperature range of the catalyst previously set. In this way, there is no possibility that an estimated catalytic temperature will be too low compared to the actual value. Therefore, there is no possibility that when the temperature of catalyst exceeds its heat-resisting temperature, F/C control will be performed. Thus, in thermal degradation of the catalyst, the worst case can be prevented.

Note that in the present invention, even when predetermined conditions for starting fuel/cut (F/C) control are met, the F/C control is stopped, if a catalytic temperature estimated exceeds a predetermined temperature. In this way, the catalyst can be prevented from reaching high temperature in an atmosphere of oxidization (lean air-fuel ratio).

To achieve the aforementioned object of the present invention, there is also provided a method of periodically estimating a temperature of an exhaust-gas purifying catalyst provided in an exhaust pipe of an internal combustion engine. The method comprises a first step of estimating a steady catalytic temperature under a steady operation of the internal combustion engine, based on operating conditions of the internal combustion engine; a second step of estimating a representative temperature of an interior wall of the exhaust pipe extending from the internal combustion engine to the catalyst, based on the steady catalytic temperature estimated in the first step; a third step of estimating a catalyst inflow exhaust-gas temperature that flows in the catalyst, based on the steady catalytic temperature estimated in the first step and the representative temperature of an interior wall of the exhaust pipe estimated in the second step; and a fourth step of estimating the temperature of the catalyst based on the catalyst inflow exhaust-gas temperature estimated in the third step. The first, second, third, and fourth steps are carried out in each cycle. In this way, a catalytic temperature is estimated in consideration of the amount that the heat of exhaust gases is absorbed by the interior wall of the exhaust pipe, so it can be accurately estimated.

In the aforementioned first step, engine speed and engine load are employed as the operating conditions of the internal combustion engine. For that reason, the steady catalytic temperature is estimated according to the operating conditions of the internal combustion engine, that is, engine speed (Ne) and engine load (Pb). Thus, the temperature of the catalyst is estimated according to engine operating conditions obtained in each cycle and can be more accurately estimated.

In the aforementioned second step, the representative temperature is estimated on the assumption that it changes with a first-order lag corresponding to an exhaust-gas flow velocity within the exhaust pipe with respect to a change in the steady catalytic temperature estimated in the first step. Therefore, the temperature of the catalyst can be more accurately estimated.

In the aforementioned third step, the catalyst inflow exhaust-gas temperature is estimated by computing the weighted average of the steady catalytic temperature estimated in the first step and the representative temperature estimated in the second step, according to an exhaust-gas flow quantity within the exhaust pipe. Therefore, the temperature of the catalyst can be more accurately estimated.

In the aforementioned fourth step, the temperature of the catalyst is estimated on the assumption that the temperature of the catalyst changes with a first-order lag corresponding to an exhaust-gas flow quantity within the exhaust pipe with respect to a change in the catalyst inflow exhaust-gas temperature estimated in the third step. Therefore, the temperature of the catalyst can be more accurately estimated.

To achieve the aforementioned object of the present invention, there is also provided a method of periodically estimating a temperature of an exhaust-gas purifying catalyst provided in an exhaust pipe of an internal combustion engine. The method comprises (1) the step of estimating a steady catalytic temperature under a steady operation of the internal combustion engine, based on operating conditions of the internal combustion engine; (2) the step of estimating a representative temperature of an interior wall of the exhaust pipe extending from the engine to the catalyst, based on the estimated steady catalytic temperature; (3) the step of estimating a catalyst inflow exhaust-gas temperature that flows in the catalyst, based on the estimated steady catalytic temperature and the estimated representative temperature; and (4) the step of estimating the temperature of the catalyst based on the estimated catalyst inflow exhaust-gas temperature. The representative temperature is estimated in consideration of the amount of heat of exhaust gases that is absorbed by the interior wall of the exhaust pipe, corresponding to an exhaust-gas flow quantity. Therefore, since the temperature reduction quantity is estimated according to vehicle speed in each cycle, the temperature of the catalyst can be more accurately estimated.

BRIEF DESCRIPTION OF THE DRAWINGS

The present invention will be described in further detail with reference to the accompanying drawings wherein.

DESCRIPTION OF THE PREFERRED EMBODIMENTS

Embodiment of the present invention will be hereinafter described with reference to drawings.

(1) First Embodiment

Figure 1:
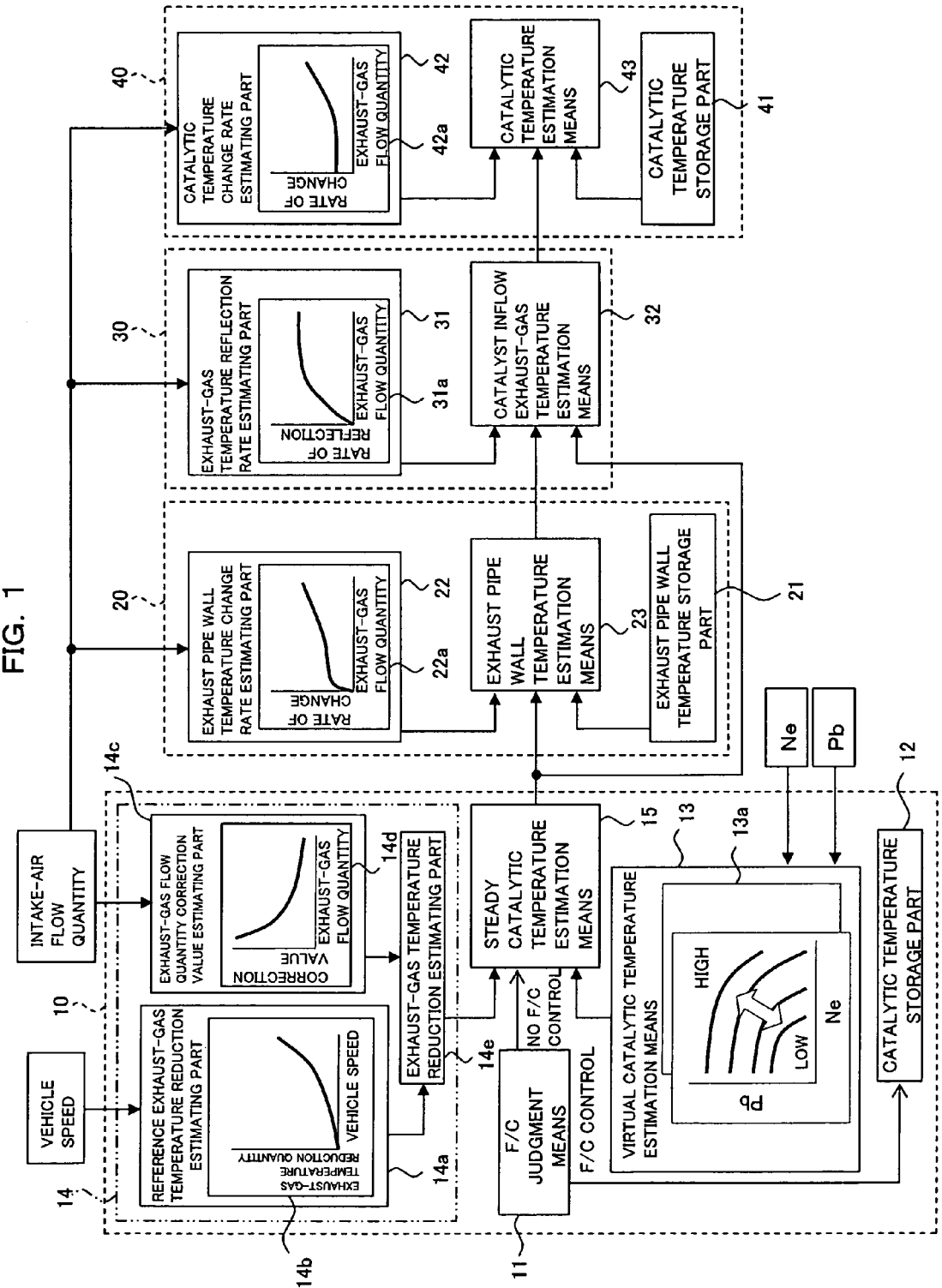
FIG. 1 is a simplified block diagram showing a catalytic temperature estimating device constructed in accordance with a first embodiment of the present invention.
Figure 2A:
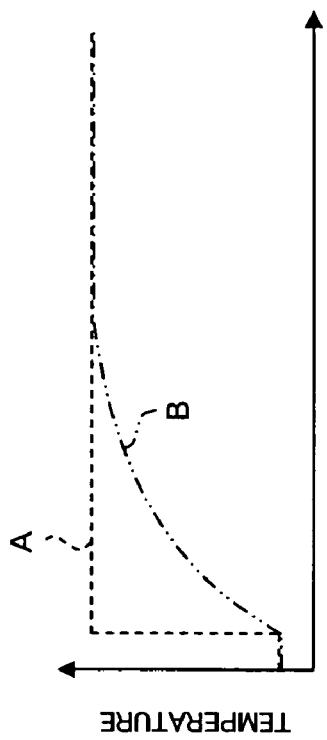
FIGS. 2(a) to 2(c) are conceptual diagrams showing how a catalytic temperature is estimated by the catalytic temperature estimating device constructed in accordance with the first embodiment of the present invention.
Figure 2B:
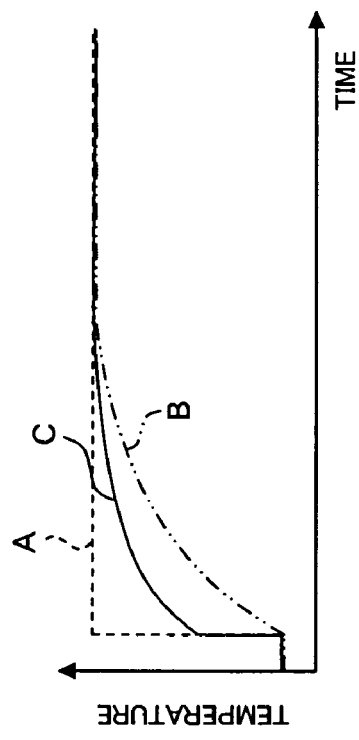
Figure 2C:
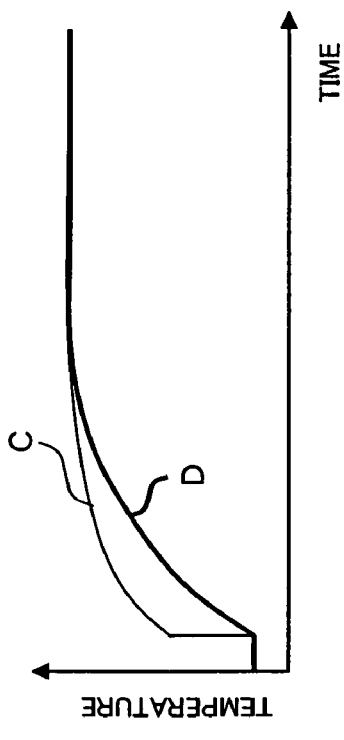
Figure 3:
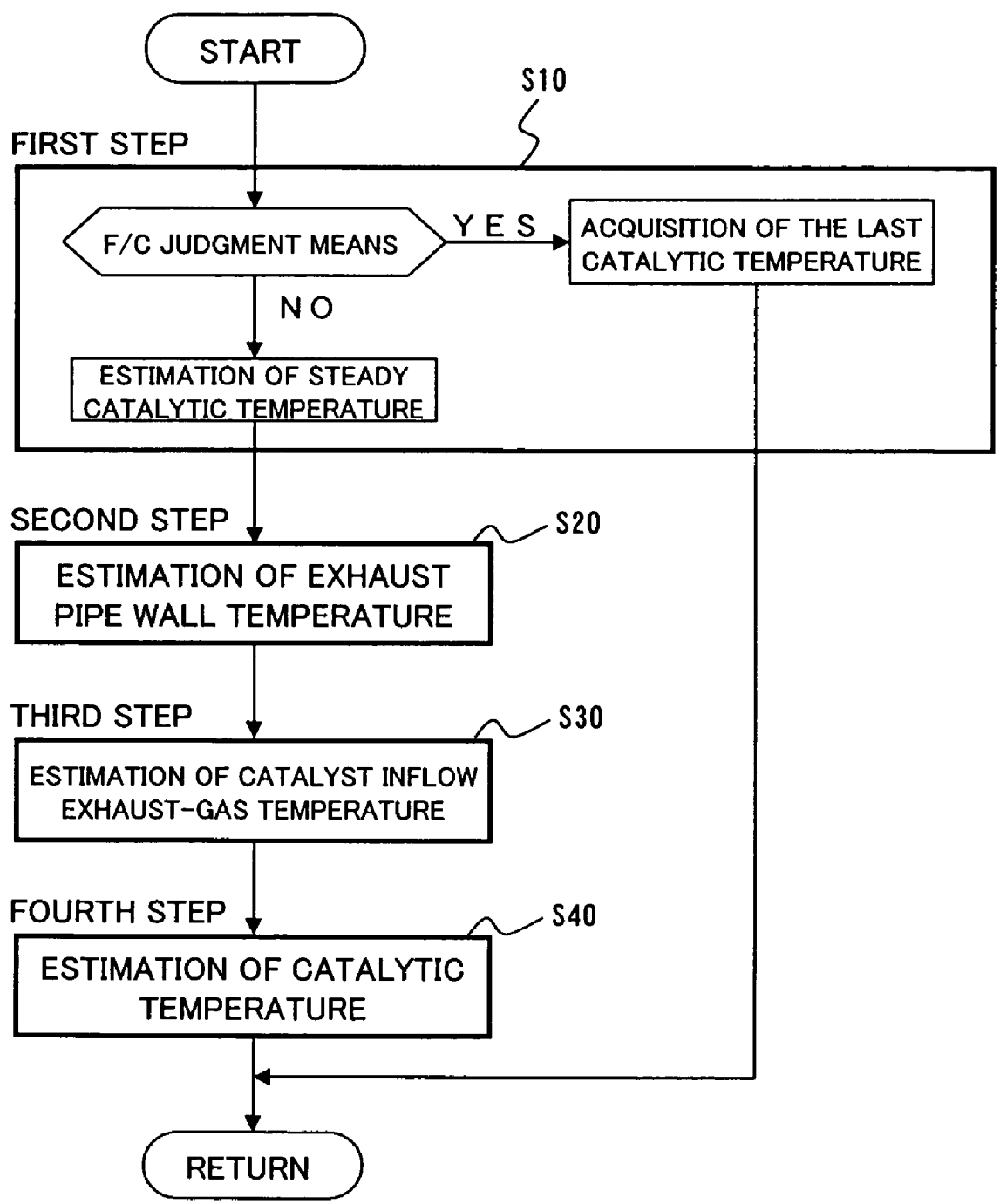
FIG. 3 is a flow chart representing the essential steps in a method of estimating a catalytic temperature, constructed in accordance with the first embodiment of the present invention.

Referring to FIGS. 1 to 3, there are shown a catalytic temperature estimating device and a catalytic temperature estimating method, constructed in accordance with a first embodiment of the present invention. FIG. 1 is a simplified block diagram showing a catalytic temperature estimating device constructed in accordance with a first embodiment of the present invention, FIGS. 2(a) to 2(c) are conceptual diagrams showing how a catalytic temperature is estimated by the catalytic temperature estimating device constructed in accordance with the first embodiment of the present invention and FIG. 3 is a flow chart representing the essential steps in a method of estimating a catalytic temperature, constructed in accordance with the first embodiment of the present invention.

As shown in FIG. 1, the catalytic temperature estimating device according to the first embodiment is made up of first estimation means 10, second estimation means 20, third estimation means 30, and fourth estimation means 40. The first estimation means 10 is used to estimate a steady catalytic temperature, based on operating conditions of an internal combustion engine (hereinafter referred to simply as an engine). The second estimation means 20 is used to estimate the representative temperature of the interior wall of the exhaust pipe (hereinafter referred to as an exhaust pipe wall temperature) extending from the engine (particularly, the combustion chamber) to an exhaust-gas purifying catalyst (hereinafter referred to simply as a catalyst), based on the steady catalytic temperature estimated by the first estimation means 10. The third estimation means 30 is used to estimate a catalyst-inflow exhaust-gas temperature that flows in the catalyst, based on the steady catalytic temperature estimated by the first estimation means 10 and the exhaust pipe wall temperature estimated by the second estimation means 20. The fourth estimation means 40 is used to estimate the temperature of the catalyst, based on the catalyst-inflow exhaust-gas temperature estimated by the third estimation means 30.

In the first embodiment, the catalytic temperature estimating device is assumed to be installed in a vehicle having a fuel/cut (F/C) control function. The details on the F/C control are not shown, but this F/C control is performed by an electronic engine control unit (hereinafter referred to as EECU). That is, the EECU controls the amount of intake air to be admitted in the engine cylinder, the amount of fuel to be injected from the fuel injection valve into the cylinder and the injection timing, and the timing at which the spark plug is ignited to burn the fuel mixture within the cylinder. And the EECU cuts the supply of fuel to some or all of the engine cylinders if predetermined conditions are met at the time of deceleration.

Although not shown in FIG. 1, the catalytic temperature estimating device is equipped with a means of outputting start signals periodically (e.g., at intervals of 100 ms) so that steps are carried out by the first means 10, the second means 20, the third means 30, and the fourth means 40.

As shown in FIG. 1, the first estimation means 10 is made up of F/C judgment means 11, a catalytic temperature storage part 12, virtual catalytic temperature estimation means 13, exhaust-gas temperature reduction estimation means 14, and steady catalytic temperature estimation means 15. The F/C judgment means 11 is used for judging whether or not the engine is currently performing F/C control. The catalytic temperature storage part 12 is used for storing the last catalytic temperature estimated last. The virtual catalytic temperature estimation means 13 is used for estimating a virtual catalytic temperature according to the engine speed (Ne) and engine load (Pb) in the steady state of the engine. The exhaust-gas temperature reduction estimation means 14 is used for estimating an exhaust-gas temperature reduction quantity based on vehicle speed and an exhaust-gas flow quantity. The steady catalytic temperature estimation means 15 is used for estimating the temperature of exhaust gases that are exhausted from the engine combustion chamber (which corresponds to the catalytic temperature in the engine steady state and will hereinafter be also referred to an inflow exhaust-gas temperature), from the virtual catalytic temperature and the exhaust-gas temperature reduction quantity.

If it is judged by the F/C judgment means 11 that the engine is currently performing F/C control ("F/C control" in the FIG. 1), the first estimation means 10 acquires the last catalytic temperature from the catalytic temperature storage part 12 and adopts it as the current catalytic temperature. In this case, the catalytic temperature estimation ends without causing the second estimation means 20, the third estimation means 30, and the fourth estimation means 40 to estimate a catalytic temperature.

Note that when a catalytic temperature is estimated for the first time after a start of the engine, the catalytic temperature storage part 12 does not contain a catalytic temperature estimated last and therefore the first estimation means 10 adopts a previously set initial catalytic temperature as the current catalytic temperature. This initial catalytic temperature is preferably set to a relatively higher temperature within the operating temperature of the catalyst. For example, the preferred range is about 600 to 700° C. If the initial catalytic temperature is set high in this way, there is no possibility that an estimated catalytic temperature will be too low compared to the actual value. Therefore, there is no possibility that when the catalyst exceeds its heat-resisting temperature, F/C control will be performed. Thus, in thermal degradation of the catalyst, the worst case can be prevented.

Conversely, if it is not judged by the F/C judgment means 11 that the engine is performing F/C control ("NO F/C control" in the FIG. 1), the steady catalytic temperature estimation means 15 estimates a steady catalytic temperature, based on the virtual catalytic temperature estimated by the virtual catalytic temperature estimation means 13 and the exhaust-gas temperature reduction quantity estimated by the exhaust-gas temperature reduction estimation means 14.

The virtual catalytic temperature estimation means 13 stores catalytic temperature maps 13a. In the catalytic temperature maps 13a, a catalytic temperature is caused to correspond to the engine speed (Ne) and engine load (e.g., intake manifold pressure Pb) in the engine steady state obtained by experiment. The virtual catalytic temperature estimation means 13 acquires the engine speed (Ne) and engine load (Pb) that represent the operating state of the engine from the catalytic temperature maps 13a, and estimates a virtual catalyst temperature based on these engine operating conditions (Ne, Pb).

The exhaust-gas temperature reduction estimation means 14 estimates an exhaust-gas temperature reduction quantity caused by heat radiated from the exhaust pipe, according to vehicle speed and an exhaust-gas flow quantity. For that reason, the exhaust-gas temperature reduction estimation means 14 stores a reference exhaust-gas temperature reduction map 14b and a correction value map 14d. In the reference exhaust-gas temperature reduction map 14b, a reference exhaust-gas temperature reduction quantity is caused to correspond to the vehicle speed at a predetermined reference exhaust-gas flow quantity obtained by experiment (e.g., 15 liter/s at a vehicle speed of about 100 km/h). In the correction value map 14d, a correction value for the reference exhaust-gas temperature reduction quantity is caused to correspond to an exhaust-gas flow quantity obtained by experiment. Also, the exhaust-gas temperature reduction estimation means 14 is made up of a reference exhaust-gas temperature reduction estimating part 14a, an exhaust-gas flow quantity correction value estimating part 14c, and an exhaust-gas temperature reduction estimating part 14e. The reference exhaust-gas temperature reduction estimating part 14a estimates a reference exhaust-gas temperature reduction quantity based on vehicle speed. The exhaust-gas flow quantity correction value estimating part 14c estimates an exhaust-gas flow quantity correction value based on an exhaust-gas flow quantity. The exhaust-gas temperature reduction estimating part 14e estimates an exhaust-gas temperature reduction quantity, based on the reference exhaust-gas temperature reduction quantity estimated by the reference exhaust-gas temperature reduction estimating part 14a and the exhaust-gas flow quantity correction value estimated by the exhaust-gas flow quantity correction value estimating part 14c.

Since the exhaust-gas flow quantity that is discharged from the engine is determined according to the intake-air flow quantity that is admitted in the engine, the exhaust-gas flow quantity correction value estimating part 14c acquires an intake-air flow quantity from an intake-air flow sensor, etc., and computes an exhaust-gas flow quantity, for example, by multiplying the intake-air flow quantity by a predetermined gain. Note that if the engine operating state is in a transient state, a slight time difference will occur between the intake-air flow quantity and the exhaust-gas flow quantity, but it is considered practically negligible.

And the exhaust-gas flow quantity correction value estimating part 14c estimates a correction value for the reference exhaust-gas temperature reduction quantity that corresponds to the computed exhaust-gas flow quantity.

Therefore, when it is not judged by the F/C judgment means 11 that the engine is performing F/C control ("NO F/C control" in the FIG. 1), the virtual catalytic temperature estimation means 13 acquires the engine speed (Ne) and engine load (Pb) that represent the operating state of the engine, and estimates a virtual catalytic temperature based on the catalytic temperature maps 13a. Also, the exhaust-gas temperature reduction estimating part 14e of the exhaust-gas temperature reduction estimation means 14 estimates an exhaust-gas temperature reduction quantity, based on the reference exhaust-gas temperature reduction quantity corresponding to vehicle speed, estimated by the reference exhaust-gas temperature reduction estimating part 14a, and the correction value for the reference exhaust-gas temperature reduction quantity corresponding to an exhaust-gas flow quantity, estimated by the exhaust-gas flow quantity correction value estimating part 14c. At this time, the exhaust-gas temperature reduction quantity TVS is estimated by the following Eq. (1):

$$T_{VS} = K \cdot \Delta T \quad (1)$$

where $\Delta T$ is the reference exhaust-gas temperature reduction quantity and K is the correction value.

The steady catalytic temperature estimation means 15 acquires both the virtual catalytic temperature estimated by the virtual catalytic temperature estimation means 13 and the exhaust-gas temperature reduction quantity estimated by the exhaust-gas temperature reduction estimation means 14, thereby estimating a steady catalytic temperature. At this time, the steady catalytic temperature $T_{CATB}$ is estimated by the following Eq. (2):

$$T_{CATB} = T_B - T_{VS} \quad (2)$$

where $T_B$ is the virtual catalytic temperature and $T_{VS}$ is the exhaust-gas temperature reduction quantity.

As shown in FIG. 1, the second estimation means 20 is made up of an exhaust pipe wall temperature storage part 21, an exhaust pipe wall temperature change rate estimating part 22, and exhaust pipe wall temperature estimation means 23. The exhaust pipe wall temperature storage part 21 stores the last exhaust pipe wall temperature estimated last. The exhaust pipe wall temperature change rate estimating part 22 estimates an exhaust pipe wall temperature change rate that corresponds to an exhaust-gas flow quantity. The exhaust pipe wall temperature estimation means 23 estimates an exhaust pipe wall temperature, based on the steady catalytic temperature estimated by the first estimation means 10, the last exhaust pipe wall temperature, and the exhaust pipe wall temperature change rate.

The exhaust pipe wall temperature change rate estimating part 22 stores an exhaust pipe wall temperature change rate map 22a. In the exhaust pipe wall temperature change rate map 22a, an exhaust pipe wall temperature change rate is caused to correspond to an exhaust-gas flow quantity obtained by experiment. As with the exhaust-gas flow quantity correction value estimating part 14c, the exhaust pipe wall temperature change rate estimating part 22 acquires an exhaust-gas flow quantity, and estimates an exhaust pipe wall temperature change rate corresponding to this exhaust-gas flow quantity, based on the exhaust pipe wall temperature change rate map 22a.

Note that the exhaust pipe wall temperature change rate is used for making a calculation so that an exhaust pipe wall temperature changes with a first-order lag with respect to a change in a steady catalytic temperature (inflow exhaust-gas temperature). That is, in the case where the temperature of the interior wall of the exhaust pipe changes according to the exhaust-gas flow quantity (i.e., exhaust-gas flow velocity) within the exhaust pipe while absorbing the heat of exhaust gases, the exhaust pipe wall temperature changes with a first-order lag with respect to a change in the steady catalytic temperature estimated by the first estimation means 10. Hence, the exhaust pipe wall temperature change rate is provided so an exhaust pipe wall temperature can be properly estimated. Also, the exhaust pipe wall temperature change rate is determined according to the exhaust-gas flow quantity obtained in each cycle.

With the above-described construction, the exhaust pipe wall temperature estimation means 23 of the second estimation means 20 acquires the steady catalytic temperature estimated by the first estimation means 10, the last exhaust pipe wall temperature stored in the exhaust pipe wall temperature storage part 21, and the exhaust pipe wall temperature change rate estimated by the exhaust pipe wall temperature change rate estimating part 22. Based on these, the exhaust pipe wall temperature estimation means 23 estimates an exhaust pipe wall temperature. The exhaust pipe wall temperature $T_{EXW}(n)$ is estimated by the following Eq. (3):

$$T_{EXW}(n) = (1 - K_{EXW}) \cdot T_{EXW}(n-1) + K_{EXW} \cdot T_{CATB} \quad (3)$$

where $K_{EXW}$ is the exhaust pipe wall temperature change rate, $T_{EXW}(n-1)$ is the last exhaust pipe wall temperature, and $T_{CATB}$ is the steady catalytic temperature.

As shown in FIG. 2(a), when the steady catalytic temperature TCATB estimated by Eq. (2) in the first estimation means 10 rises instantaneously to a fixed temperature as indicated by a broken line A, that is, when the operating conditions of the engine change steeply, and the temperature of exhaust gases discharged from the combustion chamber rises stepwise in a moment and then becomes steady, the exhaust pipe wall temperature $T_{EXW}(n)$ estimated by the above-described Eq. (3) changes with a first-order lag with respect to the steady catalytic temperature (broken line A), as indicated by a two-dot chain line B.

Note that when a catalytic temperature is estimated for the first time after a start of the engine, the exhaust pipe wall temperature storage part 21 does not contain an exhaust pipe wall temperature estimated last and therefore the exhaust pipe wall temperature estimating part 23 adopts a previously set initial exhaust pipe wall temperature as the exhaust pipe wall temperature estimated last. This initial exhaust pipe wall temperature is preferably set to a relatively higher temperature within the operating temperature of the catalyst. For example, the preferred range is about 600 to 700° C. If the initial exhaust pipe wall temperature is set high in this way, there is no possibility that an estimated catalytic temperature will be too low compared to the actual value. Therefore, there is no possibility that when the catalyst exceeds its heat-resisting temperature, F/C control will be performed. Thus, in thermal degradation of the catalyst, the worst case can be prevented.

As shown in FIG. 1, the third estimation means 30 is made up of an exhaust-gas temperature reflection rate estimating part 31 and catalyst inflow exhaust-gas temperature estimation means 32. The exhaust-gas temperature reflection rate estimating part 31 estimates an exhaust-gas temperature reflection rate corresponding to an exhaust-gas flow quantity. The catalyst inflow exhaust-gas temperature estimation means 32 estimates an exhaust-gas temperature that flows in the catalyst (hereinafter referred to as a catalyst inflow exhaust-gas temperature), based on the steady catalytic temperature estimated by the first estimation means 10, the exhaust pipe wall temperature estimated by the second estimation means 20, and the exhaust-gas temperature reflection rate estimated by the exhaust-gas temperature reflection rate estimating part 31.

The exhaust-gas temperature reflection rate estimating part 31 stores an exhaust-gas temperature reflection rate map 31a. In the exhaust-gas temperature reflection rate map 31a, an exhaust-gas temperature reflection rate is caused to correspond to an exhaust-gas flow quantity obtained by experiment. As with the exhaust-gas flow quantity correction value estimating part 14c, the exhaust-gas temperature reflection rate estimating part 31 acquires an exhaust-gas flow quantity, and estimates an exhaust-gas temperature reflection rate that corresponds to this exhaust-gas flow quantity, based on the exhaust-gas temperature reflection rate map 31a.

Note that the exhaust-gas temperature reflection rate is used for taking into account the weight between the steady catalytic temperature and the exhaust pipe wall temperature with respect to the catalyst inflow exhaust-gas temperature, according to an exhaust-gas flow quantity. Also, the exhaust-gas temperature reflection rate is determined according to the exhaust-gas flow quantity obtained in each cycle.

With the above-described construction, the catalyst inflow exhaust-gas temperature estimation means 32 of the third estimation means 30 acquires the steady catalytic temperature estimated by the first estimation means 10, the exhaust pipe wall temperature estimated by the second estimation means 20, and the exhaust-gas temperature reflection rate estimated by the exhaust-gas temperature reflection rate estimating part 31. Based on these, the catalyst inflow exhaust-gas temperature estimation means 32 estimates a catalyst inflow exhaust-gas temperature. The catalyst inflow exhaust-gas temperature $T_{EXG}(n)$ is estimated by the following Eq. (4):

$$T_{EXG}(n)=(1-K_{EXG}) \cdot T_{EXW}(n)+K_{EXG} \cdot T_{CATB} \qquad (4)$$

where $K_{EXG}$ is the exhaust-gas temperature reflection rate, $T_{EXW}(n)$ is the exhaust pipe wall temperature, and $T_{CATB}$ is the steady catalytic temperature.

As shown in FIG. 2(b), the catalyst inflow exhaust-gas temperature $T_{EXG}(n)$ estimated by the aforementioned Eq. (4) changes as indicated by a light solid line C, by computing the weighted average of the steady catalytic temperature $T_{CATB}$ estimated by the first estimation means 10 (indicated by a broken line A in FIGS. 2(a) and 2(b)) and the exhaust pipe wall temperature $T_{EXW}(n)$ estimated by the second estimation means 20 (indicated by a two-dot chain line B in FIGS. 2(a) and 2(b)).

As shown in FIG. 1, the fourth estimation means 40 is made up of a catalytic temperature storage part 41, a catalytic temperature change rate estimating part 42, and catalytic temperature estimation means 43. The catalytic temperature storage part 41 stores the last catalytic temperature estimated last. The catalytic temperature change rate estimating part 42 estimates a catalytic temperature change rate that corresponds to an exhaust-gas flow quantity. The catalytic temperature estimation means 43 estimates a catalytic temperature, based on the catalyst inflow exhaust-gas temperature estimated by the third estimation means 30, the last catalytic temperature, and the catalytic temperature change rate.

The catalytic temperature change rate estimating part 42 stores a catalytic temperature change rate map 42a. In the catalytic temperature change rate map 42a, a catalytic temperature change rate is caused to correspond to an exhaust-gas flow quantity obtained by experiment. As with the exhaust-gas flow quantity correction value estimating part 14c, the catalytic temperature change rate estimating part 42 acquires an exhaust-gas flow quantity, and estimates a catalytic temperature change rate that corresponds to this exhaust-gas flow quantity, based on the catalytic temperature change rate map 42a.

Note that the catalytic temperature change rate is used for making a calculation so that a catalytic temperature changes with a first-order lag with respect to a change in the catalyst inflow exhaust-gas temperature estimated by the third estimation means 30. That is, in the case where the catalyst changes according to the exhaust gases flowing in the catalyst (also referred to as catalyst-inflow exhaust gases) while absorbing the heat of the catalyst inflow exhaust gases, the catalyst changes with a first-order lag with respect to a change in the catalyst inflow exhaust-gas temperature estimated by the third estimation means 30. Hence, the catalytic temperature change rate is provided so that a catalytic temperature can be properly estimated. Also, the catalytic temperature change rate is determined according to the exhaust-gas flow quantity obtained in each cycle.

With the above-described construction, the catalytic temperature estimation means 43 of the fourth estimation means 40 acquires the catalyst inflow exhaust-gas temperature estimated by the third estimation means 30, the last catalytic temperature stored in the catalytic temperature storage part 41, and the catalytic temperature change rate estimated by the catalytic temperature change rate estimating part 42. Based on these, the catalytic temperature estimation means 43 estimates a catalytic temperature. The catalytic temperature $T_{CAT}(n)$ is estimated by the following Eq. (5):

$$T_{CAT}(n)=(1-K_{CAT}) \cdot T_{CAT}(n-1)+K_{CAT} \cdot T_{EXG}(n) \qquad (5)$$

where $T_{CAT}(n-1)$ is the last catalytic temperature, $K_{CAT}$ is the catalytic temperature change rate, and $T_{EXG}(n)$ is the catalyst inflow exhaust-gas temperature.

As shown in FIG. 2(c), the catalytic temperature $T_{CAT}$ is estimated by Eq. (5) so that as indicated by a heavy solid line D, it changes with a first-order lag with respect to the catalyst inflow exhaust-gas temperature $T_{EXG}(n)$ (indicated by a light solid line C in FIGS. 2(b) and 2(c)) estimated by the third estimation means 30.

Note that when a catalytic temperature is estimated for the first time after a start of the engine, the catalytic temperature storage part 41 does not contain a catalytic temperature estimated last and therefore the catalytic temperature estimation means 43 adopts a previously set initial catalytic temperature as the catalytic temperature estimated last. As with the above-described case, this initial catalytic temperature is preferably set to a relatively higher temperature within the operating temperature of the catalyst. For example, the preferred range is 600 to 700° C. If the initial catalytic temperature is set high in this way, there is no possibility that an estimated catalytic temperature will be too low compared to the actual value. Therefore, there is no possibility that when the catalyst exceeds its heat-resisting temperature, F/C control will be performed. Thus, in thermal degradation of the catalyst, the worst case can be prevented.

Next, a description will be given of the method for estimating a catalytic temperature, constructed in accordance with the first embodiment of the present invention.

If the estimation of a catalytic temperature is started, the steps shown in FIG. 3 are carried out periodically. In the first step S10, the judgment of F/C control is first made. If it is judged that F/C control is being performed ("YES" in the first step S10), the catalytic temperature estimated last is acquired and employed, and the catalytic temperature estimation ends.

On the other hand, if it is not judged that F/C control is being performed ("NO" in the first step S10), a steady catalytic temperature is estimated based on engine operating conditions. And in the second step S20, an exhaust pipe wall temperature is estimated based on the steady catalytic temperature. In the third step S30, a catalyst inflow exhaust-gas temperature is estimated based on the steady catalytic temperature and the exhaust pipe wall temperature. Finally, in the fourth step S40 a catalytic temperature is estimated based on the catalyst inflow exhaust-gas temperature, and the catalytic temperature estimation ends. These steps are carried out in each cycle.

The catalytic temperature estimating device and method of the first embodiment of the present invention are constructed as described above. Therefore, if the estimation of a catalytic temperature is started, in the first step S10 the F/C judgment means 11 of the first estimation means 10 judges whether or not F/C control is being performed. If it is judged that F/C control is being performed, the last catalytic temperature stored in the catalytic temperature storage part 12 is estimated as the current catalytic temperature. For that reason, there is no possibility that a catalytic temperature will be estimated based on the low virtual catalytic temperatures in the catalytic temperature maps 13a that correspond to the operating state during F/C control in which the engine load is decreasing. Even in practice, there is no possibility that a catalytic temperature will drop steeply during F/C control. Thus, the error between the estimated catalytic temperature and the actual catalytic temperature can be minimized.

In the first embodiment, even when predetermined conditions for starting F/C control are met, F/C control is stopped, if the catalytic temperature estimated by the catalytic temperature estimating device exceeds a predetermined temperature. And if fuel is supplied at a predetermined air-fuel ratio, the catalyst can be prevented from reaching high temperature in an atmosphere of oxidization (lean air-fuel ratio).

Conversely, in the first step S10, if the first estimation means 10 does not judge that F/C control is being performed, the correction of an exhaust-gas temperature reduction quantity, due to head radiated from an exhaust pipe and corresponding to vehicle speed (travel speed) and an exhaust-gas flow quantity, is performed on the catalytic temperature in the engine steady state by the steady catalytic temperature estimation means 15 of the first estimation means 10. For that reason, a catalytic temperature can be more accurately estimated. In other words, the correction of a reduction in temperature during travel is performed, so the error between the catalytic temperature estimated from the steady catalytic temperature and the actual catalytic temperature can be minimized.

Also, since the steady catalytic temperature is estimated according to engine operating conditions, that is, engine speed (Ne) and engine load (Pb), the catalytic temperature is estimated according to engine operating conditions obtained in each cycle. Thus, the catalytic temperature can be more accurately estimated.

In the second step S20, the exhaust pipe wall temperature estimation means 23 of the second estimation 20 estimates an exhaust pipe wall temperature based on the above-described steady catalytic temperature, on the assumption that an exhaust pipe wall temperature changes with a first-order lag corresponding to an exhaust-gas flow quantity (exhaust-gas flow velocity) with respect to a change in the above-described steady catalytic temperature.

In the third step S30, the catalyst inflow exhaust-gas temperature estimation means 32 of the third estimation means 30 estimates a catalyst inflow exhaust-gas temperature based on the above-described steady catalytic temperature and the above-described exhaust pipe wall temperature, by taking into consideration the weight between the steady catalytic temperature and the exhaust pipe wall temperature, with respect to the catalyst inflow exhaust-gas temperature corresponding to an exhaust-gas flow quantity.

In the last step S40, the catalytic temperature estimating part 43 of the fourth estimation means 40 estimates a catalytic temperature based on the above-described catalyst inflow exhaust-gas temperature, on the assumption that a catalytic temperature changes with a first-order lag corresponding to an exhaust-gas flow quantity (exhaust-gas flow velocity) with respect to a change in the above-described catalyst inflow exhaust-gas temperature.

Therefore, according to the catalytic temperature estimating device and method of the present invention, the amount of heat of exhaust gases that is absorbed by the interior wall of the exhaust pipe, which corresponds to an exhaust-gas flow quantity, is taken into account. Thus, a catalytic temperature can be accurately estimated. In addition, since it is taken into consideration that the representative temperature of the interior wall of the exhaust pipe (exhaust pipe wall temperature) changes with a first-order lag corresponding to an exhaust-gas flow quantity (exhaust-gas flow velocity) with respect to a change in the above-described steady catalytic temperature, a catalytic temperature can be more accurately estimated.

Because it is also taken into consideration that a catalyst itself changes with a first-order lag corresponding to an exhaust-gas flow quantity (exhaust-gas flow velocity) with respect to a change in the catalyst inflow exhaust-gas temperature, the catalytic temperature can be more accurately estimated.

If the catalytic temperature estimated by the catalytic temperature estimating device and method of the first embodiment exceeds a predetermined temperature, F/C control is stopped during deceleration, whereby the catalyst can be prevented from reaching high temperature in an atmosphere of oxidization (lean air-fuel ratio).

(2) Second Embodiment

Figure 4:
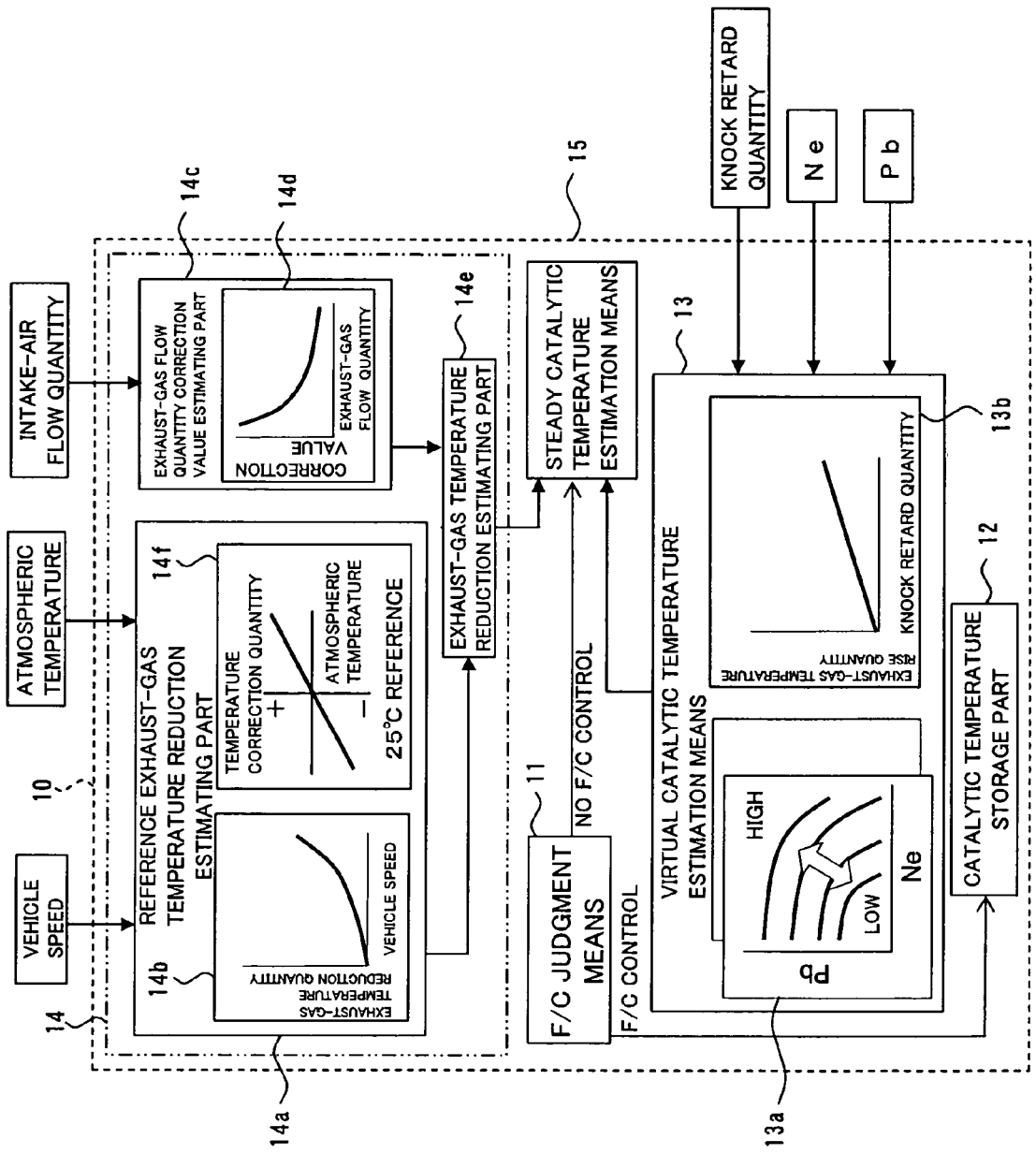
FIG. 4 is a simplified block diagram showing the first estimation means of a catalytic temperature estimating device constructed in accordance with a second embodiment of the present invention.

Referring to FIG. 4, there is shown a catalytic temperature estimating device constructed in accordance with a second embodiment of the present invention and FIG. 4 is a simplified block diagram showing the first estimation means 10 of the catalytic temperature estimating device.

The catalytic temperature estimating device and method of the second embodiment are the same as the first embodiment shown in FIGS. 1 and 3 except the construction of first estimation means 10. In FIG. 4, the same reference numerals will be applied to the same parts as the first embodiment of FIGS. 1 to 3. Therefore, a detailed description will be omitted for avoiding redundancy.

In the catalytic temperature estimating device of the second embodiment, the virtual catalytic temperature estimation means 13 of the first estimation means 10, in addition to the engine operating conditions (Ne and Pb), estimates a virtual catalytic temperature on the assumption that a virtual catalytic temperature rises according to a knock retard quantity relating to ignition timing. Also, the reference exhaust-gas temperature reduction estimating part 14a of exhaust-gas temperature reduction estimation means 14, in addition to vehicle speed, estimates an exhaust-gas temperature reduction quantity on the assumption that a reference exhaust-gas reduction quantity changes according to the atmospheric temperature of the exhaust pipe or engine intake-air temperature correlated with that atmospheric temperature. And a steady catalytic temperature is estimated based on the virtual catalytic temperature and exhaust-gas temperature reduction quantity.

That is, as shown in FIG. 4, the virtual catalytic temperature estimation means 13 stores catalytic temperature maps 13a and a knock retard rise map 13b. In the catalytic temperature maps 13a, a catalytic temperature is caused to correspond to the engine speed (ne) and engine load (Pb) in the engine steady state obtained by experiment. In the knock retard rise map 13b, an exhaust-gas temperature rise quantity is caused to correspond to a knock retard quantity obtained by experiment. The virtual catalytic temperature estimation means 13 acquires engine operating conditions (Ne and Pb) and a knock retard quantity, and estimates a virtual catalytic temperature, based on the catalytic temperature maps 13a and knock retard rise map 13b.

Note that in an electronic engine control unit (EECU), the knock retard quantity is set based on the knock information from a knock sensor, etc. For that reason, the virtual catalytic temperature estimation means 13 estimates a virtual catalytic temperature, based on the knock retard quantity information set in this way.

Also, the reference exhaust-gas temperature reduction estimating part 14a of the exhaust-gas temperature reduction estimation means 14 stores a reference exhaust-gas temperature reduction map 14b and an atmospheric temperature correction map 14f. In the reference exhaust-gas temperature reduction map 14b, a reference exhaust-gas temperature reduction quantity is caused to correspond to the vehicle speed at a predetermined reference exhaust-gas flow quantity obtained by experiment (e.g., 15 liter/s at a vehicle speed of about 100 km/h). In the atmospheric temperature correction map 14f, an exhaust-gas temperature reduction quantity is caused to correspond to the atmospheric temperature of the exhaust pipe relative to a predetermined reference temperature (e.g., 25° C.) obtained by experiment. The reference exhaust-gas temperature reduction estimating part 14a acquires the speed of the vehicle and the atmospheric temperature of the exhaust pipe, and estimates a reference exhaust-gas temperature reduction quantity, based on the reference exhaust-gas temperature reduction map 14b and atmospheric temperature correction map 14f.

Note that the atmospheric temperature of the exhaust pipe is obtained from a temperature sensor, etc., provided near the exhaust pipe. Or, it may employ the temperature of the outside air, the engine intake-air temperature obtained from an intake-air sensor provided in the engine, etc.

Therefore, if it is not judged by the F/C judgment means 11 that F/C control is being performed ("NO F/C control in the FIG. 4), the virtual catalytic temperature estimation means 13 acquires an engine speed (Ne) and engine load (Pb) that represent engine operating conditions and then estimates a catalytic temperature based on the catalytic temperature maps 13a. The virtual catalytic temperature estimation means 13 also acquires a knock retard quantity and then estimates an exhaust-gas temperature rise quantity based on the knock retard rise map 13b. And the exhaust-gas temperature rise quantity estimated based on the knock retard rise map 13b is added to the catalytic temperature estimated based on the catalytic temperature maps 13a, whereby a virtual catalytic temperature is estimated.

The reference exhaust-gas temperature reduction estimating part 14a of the exhaust-gas temperature reduction estimation means 14 acquires vehicle speed and estimates a virtual reference exhaust-gas temperature reduction quantity based on the reference exhaust-gas temperature reduction map 14b. The reference exhaust-gas temperature reduction estimating part 14a also acquires the atmospheric temperature of the exhaust pipe and estimates an atmospheric temperature correction value. And by subtracting the estimated atmospheric temperature correction value from the estimated virtual reference exhaust-gas temperature reduction quantity, a reference exhaust-gas temperature reduction quantity is estimated.

The exhaust-gas temperature reduction estimating part 14e of the exhaust-gas temperature reduction estimation means 14 estimates an exhaust-gas temperature reduction quantity by the aforementioned Eq. (1), based on the reference exhaust-gas temperature reduction quantity estimated by the reference exhaust-gas temperature reduction estimating part 14a and the exhaust-gas flow quantity correction value estimated by the exhaust-gas flow quantity correction value estimating part 14c.

As with the first embodiment, the steady catalytic temperature estimation means 15 of the first estimation means 10 estimates a steady catalytic temperature by the aforementioned Eq. (2), based on the virtual catalytic temperature estimated by the virtual catalytic temperature estimation means 13 and the exhaust-gas temperature reduction quantity estimated by the exhaust-gas temperature reduction estimation means 14.

The second estimation means 20, third estimation means 30, and fourth estimation means 40 of the catalytic temperature estimating device of the second embodiment are the same as the first embodiment of FIG. 1, and the catalytic temperature estimating method of the second embodiment is the same as the first embodiment of FIG. 3. Therefore, the description is omitted for avoiding redundancy.

The catalytic temperature estimating device and method of the second embodiment of the present invention are constructed as described above. Therefore, if the estimation of a catalytic temperature is started, in the first step S10 (see FIG. 3) the F/C judgment means 11 of the first estimation means 10 judges whether or not F/C control is being performed. If it is not judged that F/C control is being performed, in the first step S10 the steady catalytic temperature estimation means 15 of the first estimation means 10 estimates a steady catalytic temperature. At this time, the virtual catalytic temperature estimation means 13 of the first estimation means 10 estimates a virtual catalytic temperature in consideration of a knock retard quantity. Also, the exhaust-gas temperature reduction estimation means 14 of the first estimation means 10, in addition to vehicle speed (travel speed) and an exhaust-gas flow quantity, estimates an exhaust-gas temperature reduction quantity in consideration of an atmospheric temperature. And the steady catalytic temperature estimation means 15 estimates the steady catalytic temperature in the engine steady state, based on the estimated virtual catalytic temperature and the estimated exhaust-gas temperature reduction quantity.

Therefore, in the second embodiment, a virtual catalytic temperature, in addition to engine operating conditions (Ne and Pb), is estimated on the assumption that it rises according to a knock retard quantity relating to ignition timing. A reference exhaust-gas temperature reduction quantity, in addition to vehicle speed, is estimated on the assumption that it changes according to the atmospheric temperature of the exhaust pipe (that is, on the assumption that the heat radiated from the exhaust pipe changes according to the atmospheric temperature of the exhaust pipe). For that reason, corrections of an exhaust-gas temperature rise quantity due to a knock retard quantity and of an exhaust-gas temperature reduction quantity (or an exhaust-gas temperature rise quantity) due to a travel wind allowing for the atmospheric temperature of the exhaust pipe (i.e., the outside air temperature) are made on a catalytic temperature that is finally estimated. Thus, a catalytic temperature can be more accurately estimated.

(3) Third Embodiment

Figure 5:
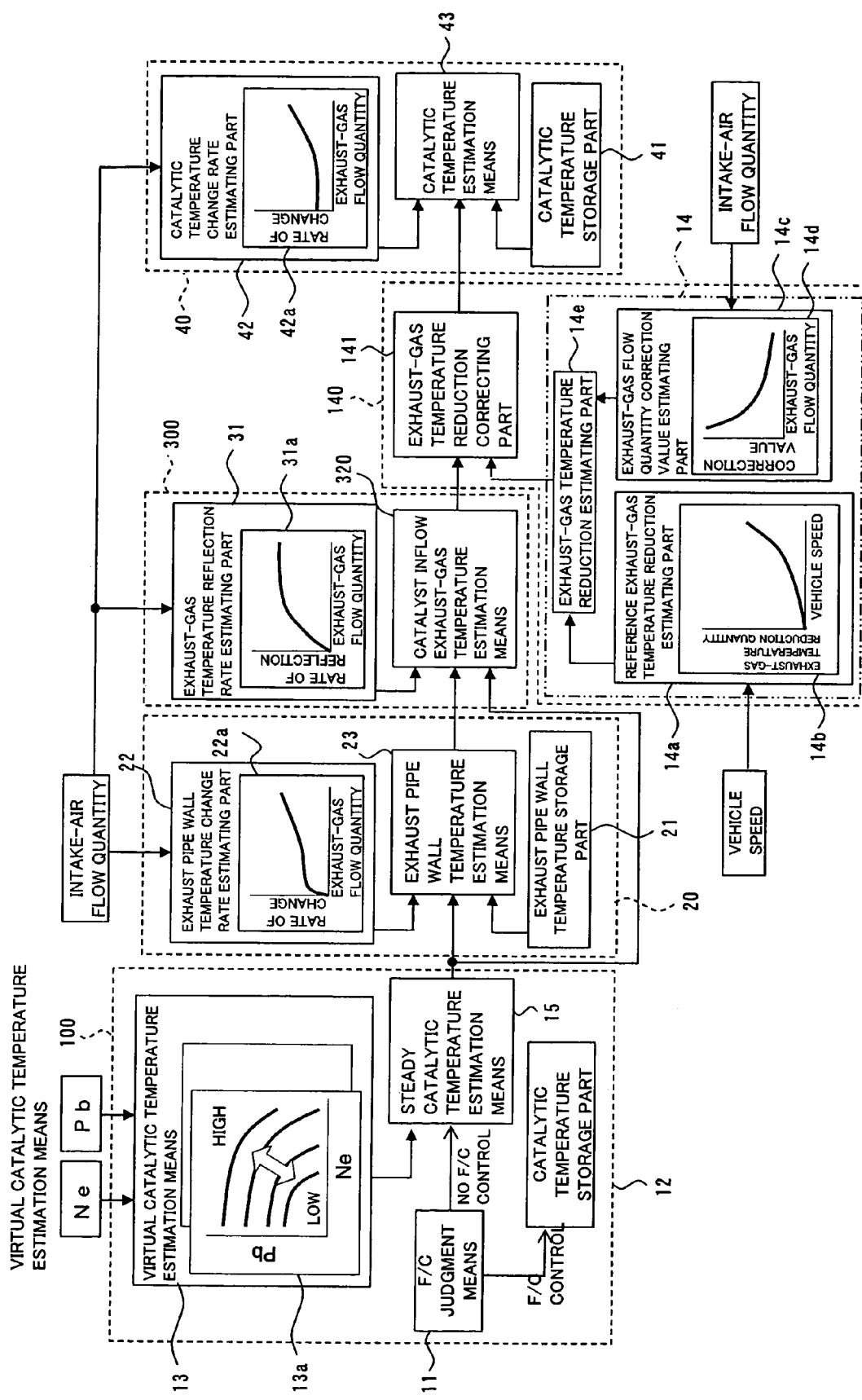
FIG. 5 is a simplified block diagram showing a catalytic temperature estimating device constructed in accordance with a third embodiment of the present invention.
Figure 6:
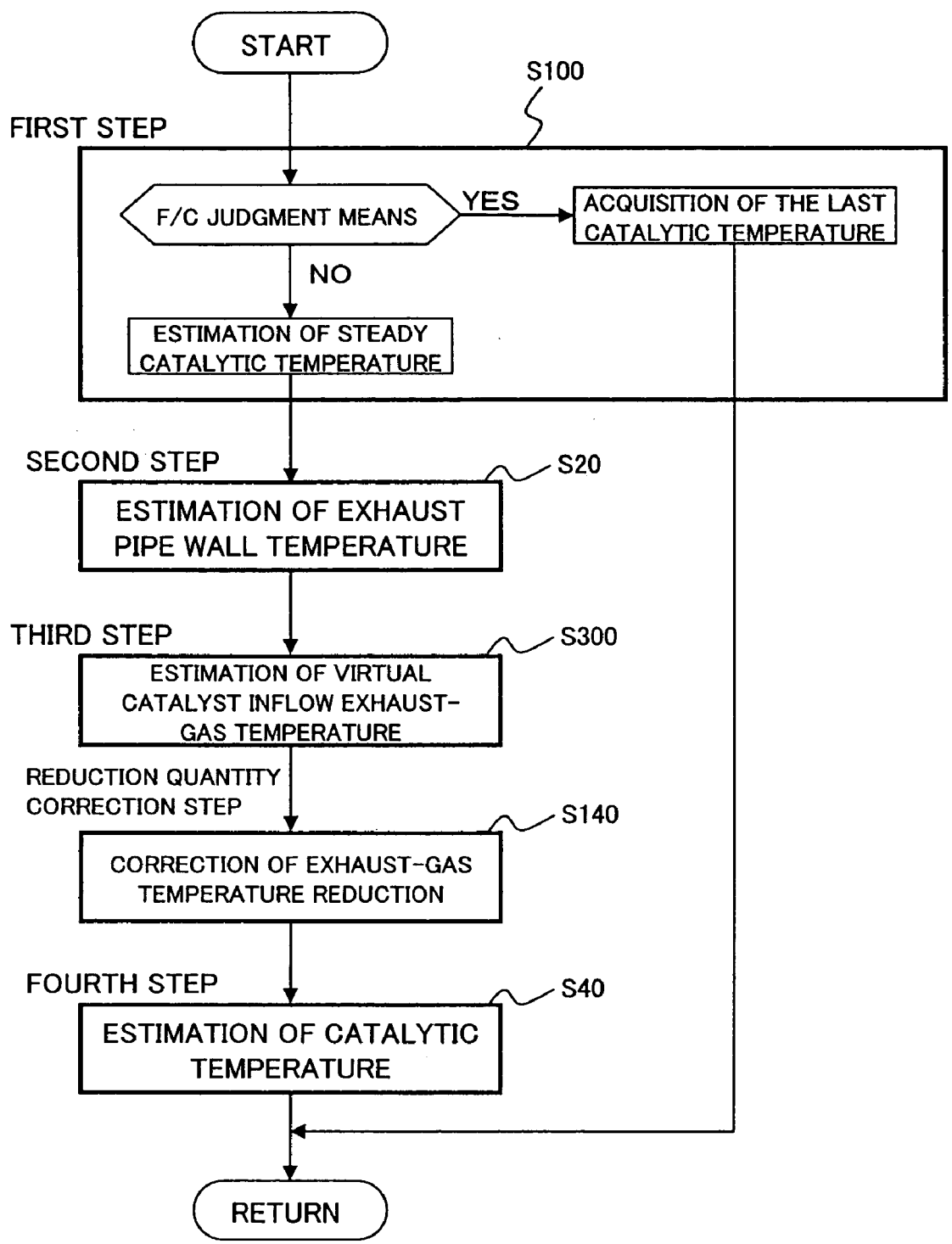
FIG. 6 is a flow chart representing the essential steps in a method of estimating a catalytic temperature, constructed in accordance with the third embodiment of the present invention.

Referring to FIGS. 5 and 6, there are shown a catalytic temperature estimating device and a catalytic temperature estimating method, constructed in accordance with a third embodiment of the present invention. FIG. 5 is a simplified block diagram showing the catalytic temperature estimating device and FIG. 6 is a flow chart representing the essential steps in a method of estimating the catalytic temperature. In the figures, the same reference numerals will be applied to the same parts as the first embodiment of FIGS. 1 to 3.

As illustrated in FIG. 5, the catalytic temperature estimating device of the third embodiment is made up of first estimation means 100, second estimation means 20, third estimation means 300, exhaust-gas temperature reduction correction means 140, and fourth estimation means 40. The first estimation means 100 is used for estimating a steady catalytic temperature based on engine operating conditions. The second estimation means 20 is used for estimating an exhaust pipe wall temperature from the engine to the catalyst, based on the estimated steady catalytic temperature. The third estimation means 300 is used for estimating a virtual catalyst inflow exhaust-gas temperature that flows in the catalyst, based on the estimated steady catalytic temperature and the estimated exhaust pipe wall temperature. The exhaust-gas temperature reduction correction means 140 is used for estimating a catalyst inflow exhaust-gas temperature by performing, on the estimated virtual catalyst inflow exhaust-gas temperature, the corrections of the speed of the vehicle and of an exhaust-gas temperature reduction quantity due to the radiant heat from the exhaust pipe corresponding to an exhaust-gas flow quantity. The fourth estimation means 40 is used for estimating the temperature of the catalytic based on the estimated catalyst inflow exhaust-gas temperature.

The first estimation means 100 of the third embodiment does not contain the catalytic temperature reduction estimation means 14 of the first estimation means 10 of the first embodiment, but the exhaust-gas temperature reduction correction means 140 is constructed such that the correction of the exhaust-gas temperature reduction quantity estimated by the exhaust-gas temperature reduction estimation means 14 is made on the virtual catalyst inflow exhaust-gas temperature estimated by the third estimation means 300.

For that reason, the first estimation means 100, third estimation means 300, and exhaust-gas temperature reduction correction means 140 that differ from the first embodiment, and the catalytic temperature estimating method of the third embodiment, will be described with reference to FIGS. 5 and 6, and a description will not be given of the second estimation means 20 and fourth estimation means 40 that are the same as the first embodiment.

As illustrated in FIG. 5, the first estimation means 100 is made up of F/C judgment means 11, a catalytic temperature storage part 12, virtual catalytic temperature estimation means 13, and steady catalytic temperature estimation means 15. This first estimation means 100 is the same as the first embodiment except that it does not contain the exhaust-gas temperature reduction estimation means 14.

Therefore, if it is not judged by the F/C judgment means 11 of the first estimation means 100 that F/C control is currently being performed ("NO F/C control" in the FIG. 5), the steady catalytic temperature estimation means 15 adopts a virtual catalytic temperature estimated based on engine speed (Ne) and engine load (Pb) by the virtual catalytic temperature estimation means 13, as a steady catalytic temperature.

The third estimation means 300 is equipped with a virtual catalyst inflow exhaust-gas temperature estimating part 320, and estimates a virtual catalyst inflow exhaust-gas temperature, based on a steady catalytic temperature estimated by the first estimation means 100 and an exhaust pipe wall temperature estimated by the second estimation means 20.

The exhaust-gas temperature reduction correction means 140 is made up of exhaust-gas temperature reduction estimation means 14 that estimates an exhaust-gas temperature reduction quantity caused by a travel wind, and an exhaust-gas temperature reduction correcting part 141.

The exhaust-gas temperature reduction estimation means 14 is the same as the first embodiment. A reference exhaust-gas temperature reduction estimating part 14a estimates a reference exhaust-gas temperature reduction quantity based on vehicle speed. An exhaust-gas flow quantity correction value estimating part 14c estimates a correction value. An exhaust-gas temperature reduction estimating part 14e estimates an exhaust-gas temperature reduction quantity, based on the estimated reference exhaust-gas temperature reduction quantity and the estimated correction value.

The exhaust-gas temperature reduction correcting part 141 estimates a catalyst inflow exhaust-gas temperature by subtracting the exhaust-gas temperature reduction quantity estimated by the exhaust-gas temperature reduction estimation means 14 from the virtual catalyst inflow exhaust-gas temperature estimated by the third estimation means 300.

Note that the second estimation means 20 and the fourth estimation means 40 are the same as the first embodiment of FIGS. 1 to 3.

Next, a description will be given of the catalytic temperature estimating method of the third embodiment.

If the estimation of a catalytic temperature is started, the steps shown in FIG. 6 are periodically executed. In the first step S100, the judgment of F/C control is first made. If it is judged that F/C control is being performed ("YES" in the first step S100), the catalytic temperature estimated last is acquired and the last catalytic temperature is employed, and the catalytic temperature estimation ends. On the other hand, if it is not judged that F/C control is being performed ("NO" in the first step S100), a steady catalytic temperature is estimated based on engine operating conditions. And in the second step S20, an exhaust pipe wall temperature is estimated based on the steady catalytic temperature. In the third step S300, a virtual catalyst inflow exhaust-gas temperature is estimated based on the steady catalytic temperature and the exhaust pipe wall temperature. In a reduction quantity correction step S140, the corrections of vehicle speed and of an exhaust-gas temperature reduction quantity due to the radiant heat from the exhaust pipe corresponding to an exhaust-gas flow quantity (i.e., a quantity of reduction in the exhaust-gas temperature due to a travel wind) are made on the catalytic temperature in the engine steady state, whereby a catalyst inflow exhaust-gas temperature is estimated. In the last step S40, a catalytic temperature is estimated based on the catalyst inflow exhaust-gas temperature, and the catalytic temperature estimation ends. These steps are carried out in each cycle.

The catalytic temperature estimating device and method of the third embodiment of the present invention are constructed as described above and therefore have the same advantages as the first embodiment.

Note that in the third embodiment, the exhaust-gas temperature reduction estimation means 14 of the exhaust-gas temperature reduction correction means 140 may be constructed the same as the second embodiment. That is, in the third embodiment, the reference exhaust-gas temperature reduction estimating part 14a acquires the speed of the vehicle and the atmospheric temperature of the exhaust pipe, and estimates a reference exhaust-gas temperature reduction quantity, based on the reference exhaust-gas temperature reduction map 14b and atmospheric temperature correction map 14f. In this case, the third embodiment can obtain the same advantages as the second embodiment.

While the present invention has been described with reference to the preferred embodiments thereof, the invention is not to be limited to the details given herein, but may be modified within the scope of the invention hereinafter claimed.

For example, the present invention is not limited to the step of performing the corrections of vehicle speed (travel speed) and of an exhaust-gas temperature reduction quantity due to the radiant heat from the exhaust pipe corresponding to an exhaust-gas flow quantity, on the catalytic temperature in the engine steady state estimated by the exhaust-gas temperature reduction estimation means 14. This correction step needs to be performed on a catalytic temperature to be finally estimated.

The correction of the exhaust-gas temperature reduction quantity, which is estimated by the exhaust-gas temperature reduction estimation means 14, due to vehicle speed (travel speed) and a heat radiated from an exhaust pipe corresponding to an exhaust-gas flow quantity, may be made by multiplying an exhaust-gas temperature by a correction coefficient that consists of vehicle speed and an exhaust-gas flow quantity. At this time, parameters equivalent to the exhaust-gas temperature reduction map 14b of the exhaust-gas temperature reduction estimation means 14 may adopt values obtained by experiment.

In the above-described embodiments, when estimating an exhaust-gas temperature reduction quantity due to a travel wind by the exhaust-gas temperature reduction estimation means 14, it is estimated from the reference exhaust-gas temperature reduction map 14b in which an exhaust-gas temperature reduction quantity is caused to correspond to vehicle speed obtained by experiment in consideration of only the radiant heat from the exhaust pipe. However, the present invention is not limited to the above-described reference exhaust-gas temperature reduction map 14b. For example, the reference exhaust-gas temperature reduction map 14b may be set in consideration of the radiant heat from a catalyst, or it may be set in consideration of the exhaust-gas temperature reduction from the engine corresponding to the outside air temperature.

In the above-described embodiments, the catalytic temperature estimating device is installed in vehicles with the function of cutting fuel at the time of deceleration. However, the catalytic temperature estimating device of the present invention is also applicable to vehicles without the fuel cutting function. In this case, the first estimation means 10 or 100 can omit the F/C judgment means 11 and catalytic temperature storage part 12.

In the above-described embodiments, the engine intake-air flow quantity detected by an intake-air senor is employed as an exhaust-gas flow quantity. However, the present invention is not limited to that method of acquiring an exhaust-gas flow quantity. For example, an intake-air flow quantity may be obtained from engine speed, engine load (manifold air pressure), cube capacity, and intake-air temperature by the following Eq. (6):

Intake-air flow quantity $(L/s)=(1/760) \times$ manifold air pressure (mmHg)$\times$cube capacity $(L)\times(1/30)\times$engine speed (rpm)$\times[1/\{(1/298)$ (intake-air temperature (° C.)+273)$\}^{1/2}]$ (6)

What is claimed is:

1. A device for periodically estimating a temperature of an exhaust-gas purifying catalyst provided in an exhaust pipe of an internal combustion engine, comprising:
   first estimation means for estimating a temperature of exhaust gases that are discharged from a combustion chamber of said internal combustion engine, as a steady catalytic temperature under a steady operation of said internal combustion engine, based on operating conditions of said internal combustion engine;
   second estimation means for estimating a representative temperature of an interior wall of said exhaust pipe extending from said internal combustion engine to said catalyst, based on said steady catalytic temperature estimated by said first estimation means;
   third estimation means for estimating a catalyst inflow exhaust-gas temperature that flows in said catalyst, based on said steady catalytic temperature estimated by said first estimation means and said representative temperature of an interior wall of said exhaust pipe estimated by said second estimation means; and
   fourth estimation means for estimating the temperature of said catalyst based on said catalyst inflow exhaust-gas temperature estimated by said third estimation means.

2. The device as set forth in claim 1, wherein said first estimation means employs engine speed and engine load as the operating conditions of said internal combustion engine.

3. The device as set forth in claim 1, wherein said second estimation means estimates said representative temperature of an interior wall of said exhaust pipe on the assumption that said representative temperature of an interior wall of said exhaust pipe changes with a first-order lag corresponding to an exhaust-gas flow velocity within said exhaust pipe with respect to a change in said steady catalytic temperature estimated by said first estimation means.

4. The device as set forth in claim 1, wherein said third estimation means estimates said catalyst inflow exhaust-gas temperature by computing the weighted average of the steady catalytic temperature estimated by said first estimation means and said representative temperature of an interior wall of said exhaust pipe estimated by said second estimation means, according to an exhaust-gas flow quantity within said exhaust pipe.

5. The device as set forth in claim 1, wherein said fourth estimation means estimates the temperature of said catalyst on the assumption that the temperature of said catalyst changes with a first-order lag corresponding to an exhaust-gas flow quantity within said exhaust pipe with respect to a change in said catalyst inflow exhaust-gas temperature estimated by said third estimation means.

6. The device as set forth in claim 2, wherein said steady catalytic temperature that is estimated by said first estimation means is computed by correcting the temperature of said exhaust gases based on a temperature reduction quantity due to heat radiated from said exhaust pipe.

7. The device as set forth in claim 6, wherein said correction of the temperature reduction quantity due to the radiant heat is made according to vehicle speed and an exhaust-gas flow quantity within said exhaust pipe.

8. The device as set forth in claim 7, wherein said correction of the temperature reduction quantity according to vehicle speed is made according to an atmospheric temperature of said exhaust pipe or intake-air temperature that correlates to said atmospheric temperature.

9. The device as set forth in claim 1, wherein said steady catalytic temperature that is estimated by said first estimation means is computed by correcting the temperature of said exhaust gases according to a knock retard quantity that relates to ignition timing of said internal combustion engine.

10. The device as set forth in claim 5, wherein the temperature of said catalyst that is estimated by said fourth estimation means is computed by employing said catalyst inflow exhaust-gas temperature corrected based on a temperature reduction quantity due to heat radiated from said exhaust pipe.

11. The device as set forth in claim 10, wherein said correction of the temperature reduction quantity due to the radiant heat is made according to vehicle speed and an exhaust-gas flow quantity within said exhaust pipe.

12. The device as set forth in claim 11, wherein said correction of the temperature reduction quantity according to vehicle speed is made according to an atmospheric temperature of said exhaust pipe or intake-air temperature that correlates to said atmospheric temperature.

13. The device as set forth in claim 1, wherein:
said internal combustion engine is equipped with fuel-cut judgment means for judging whether or not fuel-cut control is being performed;
when it is judged by said fuel-cut judgment means that fuel-cut control is being performed, said first estimation means adopts the temperature of said catalyst estimated last, as the temperature of said catalyst; and
when estimating the temperature of said catalyst for the first time after a start of the internal combustion engine and it is judged by said fuel-cut judgment means that fuel-cut control is being performed, said first estimation means adopts an initial catalytic temperature that is on a higher-temperature side within an operating temperature range of said catalyst previously set, as the temperature of said catalyst.

14. The device as set forth in claim 1, wherein:
said second estimation means is constructed to estimate a representative temperature of the interior wall of said exhaust pipe, based on said steady catalytic temperature estimated by said first estimation means and a representative temperature of the interior wall of said exhaust pipe estimated last; and
when estimating the temperature of said catalyst for the first time after a start of said internal combustion engine, said second estimation means estimates a representative temperature of the interior wall of said exhaust pipe, based on said steady catalytic temperature estimated by said first estimation means and an initial exhaust pipe wall temperature that is on a higher-temperature side within an operating temperature range of said catalyst previously set.

15. A method of periodically estimating a temperature of an exhaust-gas purifying catalyst provided in an exhaust pipe of an internal combustion engine, comprising:
a first step of estimating a steady catalytic temperature under a steady operation of said internal combustion engine, based on operating conditions of said internal combustion engine;
a second step of estimating a representative temperature of an interior wall of said exhaust pipe extending from said internal combustion engine to said catalyst, based on said steady catalytic temperature estimated in said first step;
a third step of estimating a catalyst inflow exhaust-gas temperature that flows in said catalyst, based on said steady catalytic temperature estimated in said first step and said representative temperature of an interior wall of said exhaust pipe estimated in said second step; and
a fourth step of estimating the temperature of said catalyst based on said catalyst inflow exhaust-gas temperature estimated in said third step;
wherein said first, second, third, and fourth steps are carried out in each cycle.

16. The method as set forth in claim 15, wherein in said first step, engine speed and engine load are employed as the operating conditions of said internal combustion engine.

17. The method as set forth in claim 15, wherein in said second step, said representative temperature of an interior wall of said exhaust pipe is estimated on the assumption that it changes with a first-order lag corresponding to an exhaust-gas flow velocity within said exhaust pipe with respect to a change in said steady catalytic temperature estimated in said first step.

18. The method as set forth in claim 15, wherein in said third step, said catalyst inflow exhaust-gas temperature is estimated by computing the weighted average of the steady catalytic temperature of an interior wall of said exhaust pipe estimated in said first step and said representative temperature estimated in said second step, according to an exhaust-gas flow quantity within said exhaust pipe.

19. The method as set forth in claim 15, wherein in said fourth step, the temperature of said catalyst is estimated on the assumption that the temperature of said catalyst changes with a first-order lag corresponding to an exhaust-gas flow quantity within said exhaust pipe with respect to a change in said catalyst inflow exhaust-gas temperature estimated in said third step.

20. A method of periodically estimating a temperature of an exhaust-gas purifying catalyst provided in an exhaust pipe of an internal combustion engine, comprising the steps of:
estimating a steady catalytic temperature under a steady operation of said internal combustion engine, based on operating conditions of said internal combustion engine;
estimating a representative temperature of an interior wall of said exhaust pipe extending from said internal combustion engine to said catalyst, based on the estimated steady catalytic temperature;
estimating a catalyst inflow exhaust-gas temperature that flows in said catalyst, based on the estimated steady catalytic temperature and the estimated representative temperature of an interior wall of said exhaust pipe; and
estimating the temperature of said catalyst based on the estimated catalyst inflow exhaust-gas temperature;
wherein said representative temperature of an interior wall of said exhaust pipe is estimated in consideration of the amount of heat of exhaust gases that is absorbed by the interior wall of the exhaust pipe, corresponding to an exhaust-gas flow quantity.

* * * * *